Oct. 13, 1959 P. L. STANTON 2,908,270
RESUSCITATOR
Filed March 8, 1954 3 Sheets-Sheet 1
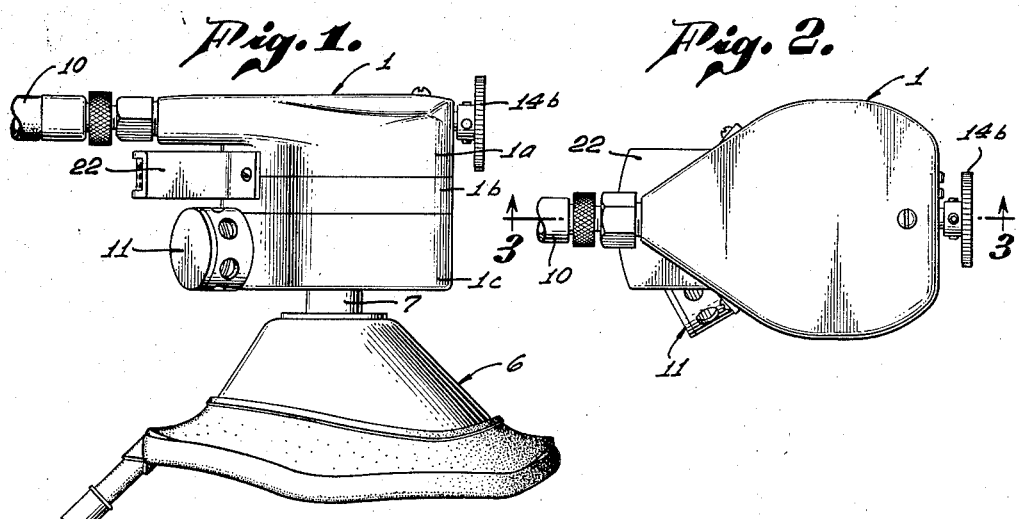
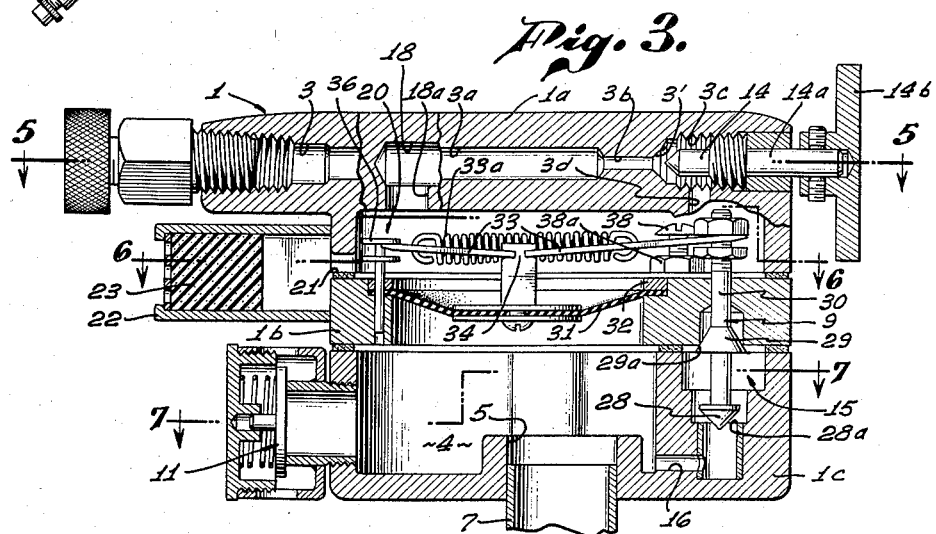
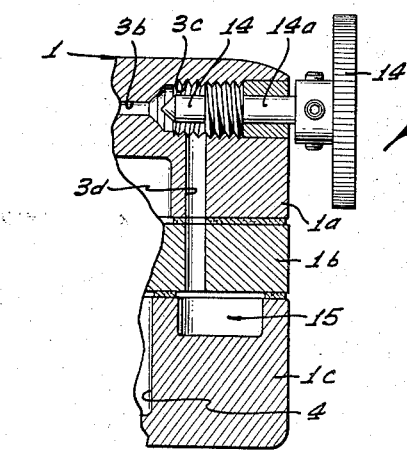
INVENTOR.
PHILIP L. STANTON,
BY
Paul A. Weilein
ATTORNEY.

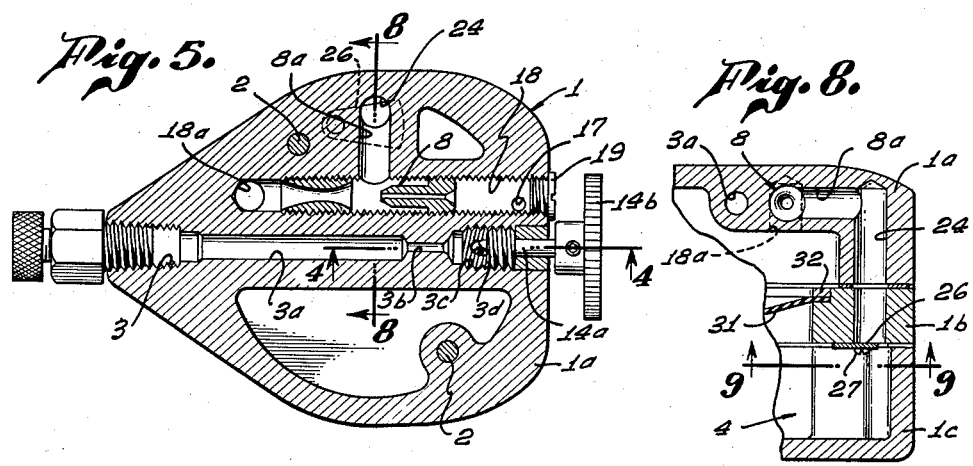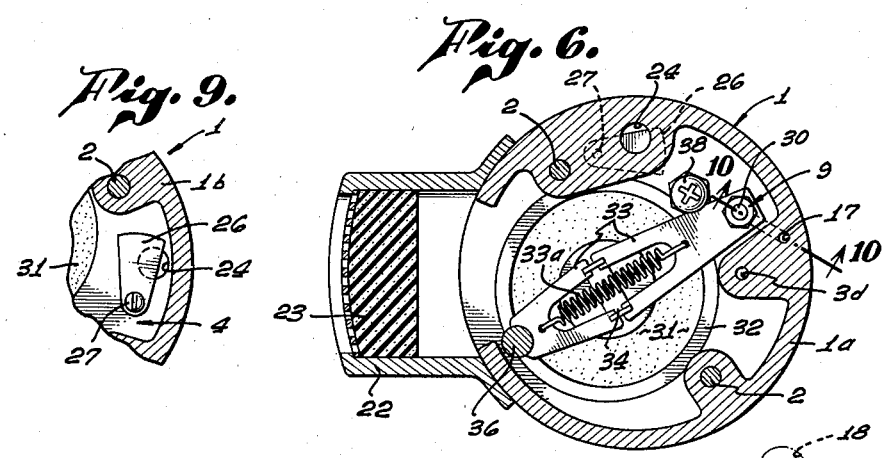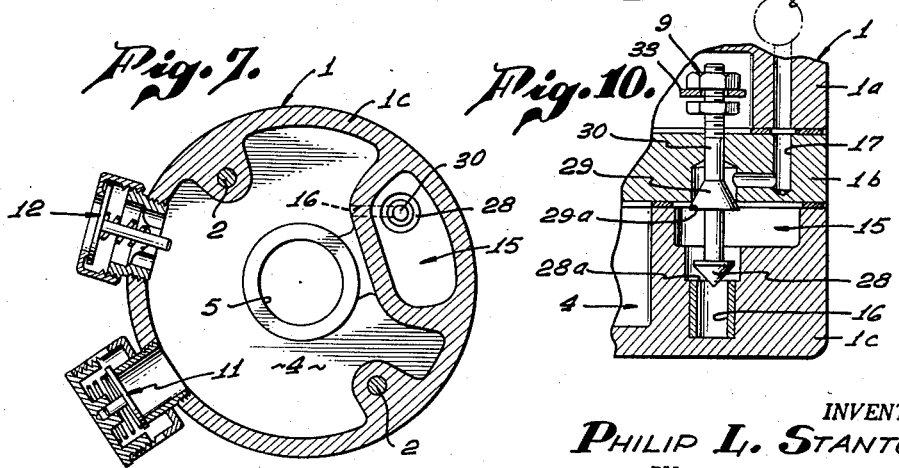

Oct. 13, 1959 P. L. STANTON 2,908,270
RESUSCITATOR
Filed March 8, 1954 3 Sheets-Sheet 3
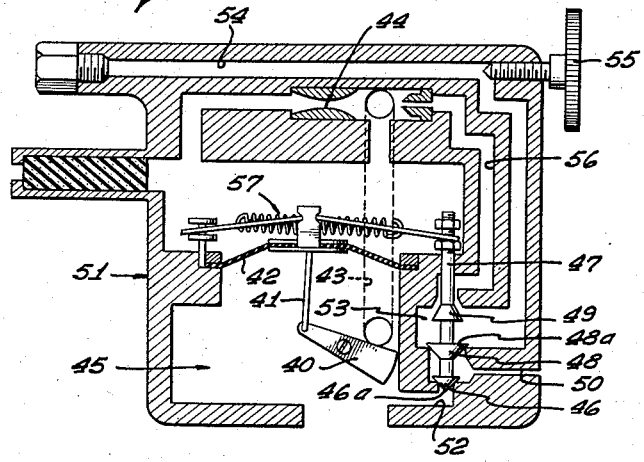
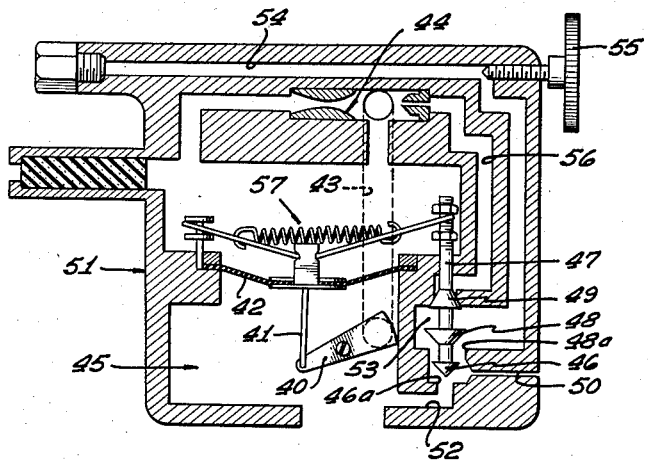
INVENTOR.
PHILIP L. STANTON,
BY
Paul A. Weilein
ATTORNEY.

United States Patent Office 2,908,270
Patented Oct. 13, 1959

2,908,270

RESUSCITATOR

Philip L. Stanton, Pasadena, Calif.

Application March 8, 1954, Serial No. 414,750

21 Claims. (Cl. 128—29)

This invention relates to gas operated resuscitators of the "pulmometric" type wherein venturi means and fluid pressure actuated valve means as associated with a gas chamber, are operable cyclically to develop positive and negative pressures in the chamber and the lungs of a patient according to the capacity of the lungs.

It has been found that resuscitators of this type, as heretofore made, are not adapted for safe or efficient use in the treatment of some infants and small animals, especially premature infants, as in such cases the trachea and lungs are exceptionally small. In consequence, the small trachea will not permit proper entry of the gas into the lungs at the rate of flow which is produced during cyclical operation of the resuscitator.

In this use of such resuscitators, if the rate of flow of gas to the resuscitator is reduced to the extent that would permit the small trachea to accommodate the proper entry of gas into the lungs, the cyclical operation of the resuscitator will stop on the exhalation phase and continuously produce negative pressure with possible serious consequence, such as collapse of the lungs. This stopping of the cyclical operation on the exhalation phase and the resultant continuous production of negative pressure is caused by the fact that when the rate of flow of the actuating gas is reduced to the extent above noted, the venturi means will not develop sufficient negative pressure to actuate the valve means for producing a positive pressure or inhalation cycle. Thus, although this continuously created negative pressure is not sufficient to actuate the valve means, it is usually sufficient to evacuate the lungs and may cause collapse of the lungs.

In consideration of the foregoing it will be apparent that such resuscitators, as heretofore made, are also not suited for efficient and safe use in thoracic surgery where it may be desirous of maintaining the lungs inflated or partially inflated or otherwise administering amounts of gas to the patient.

It is an object of the present invention, to provide a resuscitator of the character described which may be efficiently and safely used in the treatment of infants, premature infants and small animals, in thoracic surgery and in various other oxygen therapy operations, as well as for the usual resuscitation purposes.

It is another object of this invention to provide a resuscitator which in response to reduction in the flow of gas thereto, will stop the cyclical operation thereof and maintain a modified inhalation phase for introducing gas into lungs of the particular patient at the desired rate and volume less than that provided during any cyclical operation of the resuscitator.

A further object of this invention is the provision of a resuscitator such as described wherein the advantages herein noted are achieved by venting gas from the gas chamber to the atmosphere in a novel manner when the valve means is in position to permit flow of the gas into the gas chamber.

An additional object hereof is to provide a resuscitator such as described which has a vent passage affording such restricted communication of the gas chamber with the atmosphere, that the cyclical operation will stop only upon a predetermined reduction of the flow of gas to the resuscitator.

Another object of this invention is the provision of a resuscitator which in one form has a vent passage such as described, that is open at all times and will provide the advantages herein noted in a particularly efficacious manner.

A further object hereof is the provision of a resuscitator such as described which in another form provides a novel valve means for closing the passage for venting the gas chamber, on the exhalation phase and opening such passage on the inhalation phase.

This invention possesses many other advantages and has other objects which may be made more easily apparent from a consideration of several embodiments of the invention. For this purpose there are shown several forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Fig. 1 is a side elevation of a resuscitator embodying the present invention;

Fig. 2 is a top plan view thereof;

Fig. 3 is an enlarged sectional view taken on the line 3—3 of Fig. 2, with a portion broken away for clarity of illustration;

Fig. 4 is a fragmentary sectional view taken on the plane of line 4—4 of Fig. 5;

Fig. 5 is a sectional view taken on the line 5—5 of Fig. 3;

Fig. 6 is a sectional view taken on the line 6—6 of Fig. 3;

Fig. 7 is a sectional view taken on the line 7—7 of Fig. 3;

Fig. 8 is a fragmentary sectional view taken on the line 8—8 of Fig. 5;

Fig. 9 is a fragmentary sectional view taken on the line 9—9 of Fig. 8;

Fig. 10 is an enlarged fragmentary sectional view taken on line 10—10 of Fig. 6;

Fig. 11 is a schematic view of a modified form of this invention showing the position of the movable parts and the direction of flow of the gas during the negative pressure or exhalation phase; and Fig. 12 is a schematic view of the modified form shown in Fig. 11, showing the position of the movable parts and the direction of flow of the gas during the positive pressure or inhalation phase.

As shown in Figs. 1 through 10 one form of resuscitator embodying the present invention, includes a housing 1 formed of three sections designated 1a, 1b, and 1c secured together with gaskets therebetween by means of fastenings 2 and constructed to form a gas intake port 3 and a gas chamber 4. This gas chamber has a resuscitation port 5 for connection with a mask 6 to be applied to a patient. As here shown the mask is connected by means of a short tube 7 with the port 5, but it is obvious that a flexible hose, not shown, of any desired length may be used to connect the mask with the port 5.

Venturi means generally designated 8 and fluid pressure actuated valve means generally designated 9 are constructed and arranged in a manner to be hereinafter specifically described, whereby responsive to gas under pressure introduced from a source of supply, not shown, through a conduit 10 (Fig. 1) connected with the intake port 3, positive and negative pressures will be cyclically developed in the gas chamber 4, and the lungs of a patient, in accordance with the capacity of the lungs. In this operation the fluid pressure actuated valve means 9, in cooperation with passage means to be hereinafter described, will respond to predetermined positive and negative pressures, alternately to cause gas to flow to the venturi means 8 and the chamber 4, thereby creating the inhalation and exhalation phases of operation of the resuscitator.

As is customary in resuscitators of this type the housing 1 is provided with a spring-loaded, outwardly opening, safety check valve 11 for relieving excessive positive pressure in the chamber. A similar, but inwardly opening safety check valve 12 is provided for relieving excessive negative pressure in the chamber 4. The pressure actuated valve means 9 is arranged to respond to a positive pressure below that which would open the safety valve 11, as well as to respond to less negative pressure than would open the safety valve 12, all as is customary in this art.

As shown in Figs. 3 and 5 gas under pressure entering the intake port 3, will flow through an intake passage 3a formed in the upper housing section 1a. This intake passage has a restricted portion 3b opening through a needle valve seat 3' in a screw threaded counterbore 3c of passage 3a. A needle valve 14 having a stem portion 14a threaded in the counterbore 3c is operable by manipulation of a knurled hand wheel 14b on the stem, to control the flow of gas into the resuscitator. As shown in Figs. 3 and 4, particularly Fig. 4, a passage 3d which in effect, is a continuation of the intake passage, leads from the counterbore 3c downwardly through housing sections 1a and 1b into a valve chamber 15 formed in the bottom housing section 1c.

Passage means are provided between the valve chamber 15, the gas chamber 4 and venturi means 8 respectively. Thus, as shown in Fig. 3, a passage 16 leads from the lower portion of the valve chamber 15 into the gas chamber, whereas, as shown in Fig. 10 a passage 17 leads from the upper portion of the valve chamber 15 upwardly through housing sections 1b and 1a to a venturi passage 18 (see Fig. 5). The venturi passage 18 is formed in the upper housing section 1a as best shown in Fig. 5 and is closed at one end by means of a plug 19.

The gas entering the venturi passage 18 from the passage 17, passes through the venturi means 8 therein and discharges as shown in Fig. 5 through a passage 18a which is a continuation of the venturi passage and extends downwardly so as to discharge (see Fig. 3) into a chamber 20 formed between the housing sections 1a and 1b. The chamber 20 has a discharge port 21 in a side wall thereof, which conducts the gas discharge from the venturi passage, through a muffler 22 to the atmosphere. The muffler 22 is mounted as shown in Figs. 1 and 3 on the exterior of the housing and has a porous substance 23 therein to deaden the sound of the escaping gas.

The venturi means 8 includes the usual negative pressure port 8a, which as shown in Figs. 5 and 8, opens into a combined negative pressure and vent passage 24, leading downwardly (see Fig. 8) through housing sections 1a and 1b so as to communicate with the gas chamber 4. The passage 24 serves as a means for creating negative pressure in the gas chamber 4 and the lungs of a patient when the venturi means 8 is operated. It also serves as a vent passage for venting gas to the atmosphere in another phase of operation as will be hereinafter fully described.

At the lower end of the passage 24, means is provided, as shown in Figs. 8 and 9, for restricting the flow of gas from the chamber 4 into the passage 24, thence through port 8a, venturi means 8, passage 18, passage 18a, chamber 20, port 21, and muffler 22 to the atmosphere. This means comprises a small baffle plate 26 adjustably mounted by means of a screw 27 on the lower side of the housing section 1b so as to be movable to partially cover the lower end of the passage 24. After the desired restriction of vent flow is effected by adjusting the plate 26, which is a factory test operation, for the purpose hereinafter described, the screw 27 is tightened to fix the plate 26 in the proper position in which it remains in the use of the resuscitator, no adjustment thereafter being necessary.

Referring now to the fluid pressure operated valve means, best shown in Fig. 3, it will be seen that it includes a pair of coaxial valve members 28 and 29 on a common axially movable stem 30. Valve member 28 is lowermost and is cooperable with a seat 28a formed where the passage 16 leads from the valve chamber 15 to the gas chamber 4. Valve member 29 is cooperable with a seat 29a formed where the passage 17 communicates with the valve chamber 15. Accordingly, when the stem 30 is in uppermost position as shown in Fig. 3, the valve member 29 is seated and closes the passage to the venturi means 8 whereas valve member 28 is unseated, thereby permitting gas under pressure to flow through passage 16 into the gas chamber to effect the positive pressure or inhalation phase of the cyclical operation of the resuscitator. When the stem 30 is in lowermost position, valve member 28 is seated whereas valve member 29 is unseated thereby permitting flow of the gas through the passages 17 into the passage 18 for operating the venturi to create the negative pressure or exhalation phase of the cyclical operation of the resuscitator.

Movement of the valve stem 30 and valve members 28 and 29 thereon cyclically, to provide for alternately producing the inhalation and exhalation phases according to the capacity of the lungs of the patient, is effected as shown in Fig. 3 by means of fluid pressure responsive diaphragm-toggle mechanism similar to that commonly used in this art. Such mechanism is disposed between the sections 1a and 1b and occupies a portion of the chamber 20. It includes a diaphragm 31 fastened by means of a ring 32 to the housing section 1b so as to form the upper closure or wall of the gas chamber 4 and to be responsive to predetermined positive and negative pressure developed in the chamber 4. Movement of the diaphragm 31 actuates a spring loaded two section toggle lever 33 connected between its ends as at 34 with the upper side of the diaphragm. The ends of this toggle lever are connected with a stationary member 36 on the housing section 1b and with the valve stem 30, respectively. A retractible spring 33a is connected at its ends with the two sections of the toggle lever 33 so as to bias the lever to off center position. Opposed stop members 38 and 38a on the housing section 1b are arranged to limit movement of the toggle lever to positions in which the valve members 28 and 29 are properly seated and unseated.

It will now be apparent that the diaphragm 31 is at all times in one or the other of two positions by reason of the spring bias. When the diaphragm is in downwardly bowed position as shown in Fig. 3, the toggle lever 33 holds the valve stem 30 in raised position with valve member 29 seated and valve member 28 unseated to produce the inhalation or positive pressure phase. When the diaphragm is in upwardly bowed position, the toggle lever 33 maintains the valve stem in a position seating valve member 28 and unseating valve member 29 to produce the negative pressure or exhalation phase.

As the diaphragm 31 is moved from one position to the other to actuate the valve means 9 responsive to positive and negative pressures developed in the gas chamber 4, it is apparent that these pressures should be predetermined and this is accomplished by the load imposed thereon by the spring 33a. As is customary in this art, the spring load is such that the diaphragm will respond to pressures which in this art are known to be safe in resuscitation operations. Additional safety measures preventing injurious inflation and deflation of the patient's lungs, are provided by the safety check valves 11 and 12 hereinbefore described.

OPERATION

From the foregoing description, it will be apparent to those skilled in this art, that upon adjusting the control valve 14 so that the flow of gas under pressure to the resuscitator is sufficient to cause the development of predetermined positive and negative pressures in the gas chamber 4, the fluid pressure actuated valve means 9 will be cyclically operated, thereby producing the inhalation and exhalation phases of operation according to the capacity of the lungs of the patient.

It should be noted that the passage 24, port 8a, venturi means 8, passages 21 and 18a, chamber 20, port 21 and muffler 22 provide a direct outlet for venting positive pressure to the atmosphere during the normal cyclical operation. However, the restriction provided by the plate 26 at the lower end of the passage 24a as determined by the factory setting of this plate, is such that the escape of positive pressure will not prevent the development in the chamber 4 of sufficient pressure to actuate the diaphragm 31 for effecting the exhalation phase, provided the valve 14 is adjusted to maintain an adequate gas flow as readily determinable by the operator. During the operation of the venturi means 8, the aforesaid open vent passage to the atmosphere is, of course, inoperative as a vent, due to the development of negative pressure through the port 8a and the passage 24 leading to the gas chamber 4.

The normal operation of the resuscitator is well suited and subject to the desired regulation for the treatment of adults and children but for the reasons hereinbefore noted, requires modification in treating some infants, premature infants, and small animals as well as in the use of the device in connection with thoracic surgery.

The present invention by reason of the provision for venting positive pressure from the gas chamber 4, makes it possible safely to use this resuscitator for treating such infants, premature infants and small animals as well as in thoracic surgery.

Accordingly upon manipulating the control valve 14 to reduce the flow of gas below that which will cause cyclical operation of the resuscitator, while the fluid responsive valve means 9 is positioned to cause the flow of gas into the gas chamber 4, the vent passage to the atmosphere formed by the restricted passage 24, port 8a, venturi means 8, passages 21 and 18a, chamber 20, port 21 and muffler 22, will release sufficient gas from the chamber 4 to prevent the diaphragm from being actuated, thereby rendering the resuscitator suitable for a safe and efficient administration of gas to infants, premature infants and small animals as well as adapted for safe use in maintaining lung inflation during thoracic surgery.

A modified form of this invention as schematically shown in Figs. 11 and 12, embodies the same structural and operational features that are shown in Figs. 1 through 10, except as to the use of two valve members in addition to the same valve means as shown in Figs. 1 through 10, and a different vent passage for bleeding gas from the gas chamber to the atmosphere.

In this modified form a pivoted valve member 40 connected by a link 41 with the diaphragm 42 operates as shown in Fig. 12 to close the negative pressure passage 43 between the venturi means 44 and the gas chamber 45 on the inhalation phase and to open this passage as shown in Fig. 11 on the exhalation phase.

Also in this modified form is a valve member 46 mounted on the valve stem 47 which carries the other valve members 48 and 49 corresponding to the valve members 28 and 29 in Figs. 1–10. The additional valve member 46 controls a vent passage 50 which leads through the housing 51 from the passage 52 that communicates the valve chamber 53 with the gas chamber 45. The seats 46a and 48a for the valve members 46 and 48 respectively, are axially spaced in the passage 52. This inner end of the vent passage 50 opens into the passage 52 at a point between the valve seats 46a and 48a whereas the outer end of the passage 50 is open to the atmosphere. Thus, when the valve member 48 is seated the valve member 46 is also seated, thereby shutting off communication of the vent passage 50 with the valve chamber 53 and gas chamber 45.

At this time the valve member 49 is open, thereby allowing gas which has entered the valve chamber 53 through the inlet passage 54 controlled by the hand valve 55, to flow through the venturi passage 56 for operating the venturi means 44 to effect the exhalation phase.

When, however, the valve 49, as shown in Fig. 12, is seated and the valves 46 and 48 are unseated, the gas will flow from the valve chamber 53 through passage 52 into the gas chamber 45 to effect the positive pressure or inhalation phase. At this time some of the gas will escape through the vent passage 50. However, this passage has such a small flow capacity that the amount of gas vented will not prevent the development in the gas chamber 45 of the pressure required to actuate the diaphragm and toggle mechanism 57 to shift the valve members 46, 48 and 49. The restriction of the vent passage 50 may be effected by means, not here shown, which corresponds to that shown in Figs. 8 and 9 in connection with the passage 24, or by the size of the passage. This calibration is effected at the factory, in the same manner as hereinbefore described.

To provide for a modified inhalation phase of operation with this modified form of the invention, the same procedure is carried out as in the first described form. The valve 55 is manipulated to reduce the flow of gas to the unit to the extent that will stop the cyclical operation thereof while the valve member 49 is seated and the valve members 46 and 48 are unseated as shown in Fig. 12. Thus, the gas entering the gas chamber 45 at this reduced rate may be applied safely and properly in the treatment of infants, premature infants, and small animals, as well as in thoracic surgery, inasmuch as the vent passage 50 will bleed sufficient gas from the chamber 44 to prevent the development of sufficient pressure in the gas chamber to actuate the diaphragm-toggle mechanism for shifting the valve means. Thus, the unit will operate continuously on this modified inhalation phase for the purposes herein stated.

In this modified form of the invention the flow of gas for operating the resuscitator will be controlled by a manually operable valve (not shown in Figs. 11 and 12) and which may be of the same construction and arrangement as the needle valve 14, 14a and 14b, shown in Figs. 3 and 4.

It will now be apparent that in both forms of the invention the vent passage which provides for a restricted escape of positive pressure from the gas chamber to the atmosphere, will be effective to render the fluid pressure actuated valve means inoperative responsive to manipulation of the needle valve to reduce the flow of gas to the gas chamber, thereby providing for safely and efficiently administering a properly reduced flow of gas to the patient for the purposes hereinbefore stated.

I claim:

1. A resuscitator comprising: a housing having an intake port for gas under pressure, a gas chamber and passage means affording communication between said port and said chamber; said housing having a port for communicating said chamber with a mask to be applied to a patient; venturi means in said housing; said housing having a passage for conducting gas to said venturi means from said passage means; said venturi means including a negative pressure passage connecting said venturi means with said chamber; valve means in said passage means for controlling the flow of gas to said venturi means as well as to said chamber; fluid pressure responsive means in said chamber connected with said valve means and actuating said valve means alternately to operate said venturi means and introduce gas into said chamber responsive to positive and negative pressures in said chamber; and valve means operatively associated with said housing for regulating the flow of gas to said chamber and said venturi means; said housing having a port for venting gas from said chamber to the atmosphere at a rate such that when said last named valve means is operated to reduce the flow of gas to said chamber, the fluid pressure in said chamber will be effective for causing flow of gas to the patient but will be reduced below that required to operate said fluid pressure responsive means.

2. A resuscitator comprising: a housing having an intake port for gas under pressure, a gas chamber and passage means affording communication between said port and said chamber; said housing having a port for communicating said chamber with a mask to be applied to a patient; venturi means in said housing; said housing having a passage for conducting gas to said venturi means from said passage means; said venturi means including a negative pressure passage connecting said venturi means with said chamber; valve means in said passage means for controlling the flow of gas to said venturi means as well as to said chamber; fluid pressure responsive means in said chamber connected with said valve means and actuating said valve means alternately to operate said venturi means and introduce gas into said chamber responsive to positive and negative pressures in said chamber; manually operable valve means for controlling the flow of gas through said passage means; and means through which gas is vented from said chamber to the atmosphere at a rate and in such a manner that when said manually operable valve means is operated to effect a predetermined reduction in flow to said chamber, the pressure in said chamber will be ineffective to actuate said fluid pressure responsive means but will be sufficient to cause gas to flow to the patient.

3. A resuscitator comprising: a housing having an intake port for gas under pressure, a gas chamber and passage means affording communication between said port and said chamber; said housing having a port for communicating said chamber with a mask to be applied to a patient; venturi means in said housing; said housing having a passage for conducting gas to said venturi means from said passage means; said venturi means including a negative pressure passage connecting said venturi means with said chamber; valve means in said passage means for controlling the flow of gas to said venturi means as well as to said chamber; fluid pressure responsive means on said chamber connected with said valve means and actuating said valve means alternately to operate said venturi means and introduce gas into said chamber responsive to positive and negative pressures in said chamber; valve means operable to control the flow of gas under pressure through said passage means; and said housing having passage means operable in response to actuation of said last named valve means for venting gas from said chamber to the atmosphere operable at a rate such that the pressure in said chamber is sufficient to cause flow of gas to the patient but insufficient to render said fluid pressure responsive means operable to move said first named valve means into a position for actuating said venturi means.

4. A resuscitator comprising: a housing having an intake port for gas under pressure, a gas chamber and passage means affording communication between said port and said chamber; said housing having a port for communicating said chamber with a mask to be applied to a patient; venturi means in said housing; said housing having a passage for conducting gas to said venturi means from said passage means; said venturi means including a negative pressure passage connecting said venturi means with said chamber; valve means in said passage means for controlling the flow of gas to said venturi means as well as to said chamber; fluid pressure responsive means in said passage means connected with said valve means for actuating said valve means alternately to operate said venturi and introduce gas into said chamber responsive to predetermined positive and negative pressures developed in said chamber; valve means in said passage manually movable into different positions for regulating the flow of gas to said chamber; and means operable responsive to movement of said last named valve means into one of said positions, for venting gas from said chamber to the atmosphere while gas flows to the patient, thereby reducing the pressure in said chamber to an extent rendering said fluid pressure responsive means inoperable to move the first named valve means from the position in which gas flows from said passage means into said chamber.

5. A resuscitator comprising: a housing having an intake port for gas under pressure, a gas chamber and passage means affording communication between said port and said chamber; said housing having a port for communicating said chamber with a mask to be applied to a patient; venturi means in said housing; said housing having a passage for conducting gas to said venturi means from said passage means; said venturi means including a negative pressure passage connecting said venturi means with said chamber; valve means in said passage means for controlling the flow of gas to said venturi means as well as to said chamber; fluid pressure-responsive means in said chamber connected with said valve means and operable to move the valve means into positions for directing flow of gas through said passage means alternately to operate said venturi means and introduce gas into said chamber responsive to positive and negative pressure in said chamber; means operable on intentionally reducing flow of gas through said passage means to said chamber for venting an amount of gas from said chamber to the atmosphere such that a reduced flow of gas to the patient will take place and the pressure in said chamber will be reduced to the extent that said fluid pressure responsive means will be inoperable to move said valve means from the position in which gas continues to flow through said second mentioned port to the mask; and means optionally operable for reducing the flow of gas through said passage means to said chamber.

6. A resuscitator comprising: a housing having an intake port for gas under pressure, a gas chamber and passage means affording communication between said port and said chamber; said housing having a port for communicating said chamber with a mask to be applied to a patient; venturi means operable in said housing; said housing having a passage for conducting gas to said venturi means from said passage means; said venturi means including a negative pressure passage connecting said venturi means with said chamber; valve means in said passage means for controlling the flow of gas to said venturi means as well as to said chamber; fluid pressure responsive means in said chamber connected with said valve means and operable to move said valve means into position for directing flow of gas through said passage means alternately to operate said venturi means and introduce gas into said chamber responsive to positive and negative pressure in said chamber; means providing for a restricted escape of gas from said chamber to the atmosphere during the flow of gas from said passage means to said chamber and the discharge of gas through said second named port to said mask; the capacities of said escape means and said second named port being such that when the flow of gas to said chamber is intentionally reduced, the positive pressure in said chamber will be ineffective to actuate said fluid pressure responsive means while gas in reduced flow passes through said second named port; and means in said passage means optionally operable for so reducing the flow of gas to said chamber.

7. A resuscitator comprising: a housing having an intake port for gas under pressure, a gas chamber and passage means affording communication between said port and said chamber; said housing having a port for communicating said chamber with a mask to be applied to a patient; venturi means in said housing; said housing having a passage for conducting gas to said venturi means from said passage means; said venturi means including a negative pressure passage connecting said venturi means with said chamber; valve means in said passage means for controlling the flow of gas to said venturi means as well as to said chamber; fluid pressure-responsive means in said chamber connected with said valve means and operable for moving said valve means into positions for directing flow of gas through said passage means alternately to operate said venturi means and introduce gas into said chamber responsive to predetermined positive and negative pressures in said chamber; port means for venting a restricted amount of such gas to the atmosphere and reducing the flow of gas to the patient only during flow of gas from said passage means to said chamber at a rate such that the pressure in said chamber is ineffective to operate said valve actuating means to move said valve means to a position for operating said venturi means; and means in said passage means optionally operable to control the rate of flow of gas to said chamber.

8. A resuscitator comprising: a housing having an intake port for gas under pressure, a gas chamber and passage means affording communication between said port and said chamber; said housing having a port for communicating said chamber with a mask to be applied to a patient; venturi means in said housing; said housing having a passage for conducting gas to said venturi means from said passage means; said venturi means including a negative pressure passage connecting said venturi means with said chamber; valve means in said passage means for controlling the flow of gas to said venturi means as well as to said chamber; fluid pressure-responsive means in said chamber connected with said valve means for actuating said valve means alternately to operate said venturi means and introduce gas into said chamber responsive to positive and negative pressures in said chamber; means effective during flow of gas from said passage means to said chamber and from said chamber through said port for venting a restricted amount of such gas to the atmosphere; said last named means including a passage constantly affording communication of said chamber with the atmosphere; the capacities of said last named passage and said second named port being such that upon reducing the flow of gas through said passage means to said chamber, said fluid pressure responsive means will be inoperative to actuate said valve means; and means in said passage means operable at will to reduce the flow of gas to said chamber.

9. A resuscitator comprising: a housing having an intake port for gas under pressure, a gas chamber and passage means affording communication between said port and said chamber; said housing having a port for communicating said chamber with a mask to be applied to a patient; venturi means in said housing; said housing having a passage for conducting gas to said venturi means from said passage means; valve means operable in said passage means for controlling flow of gas to said venturi means and said chamber; and fluid pressure-responsive means in said chamber for actuating said valve means to direct flow of gas through said passage means alternately to operate said venturi means and introduce gas into said chamber responsive to positive and negative pressures in said chamber; said venturi means including a passage leading from said venturi means to said chamber for evacuating said chamber upon operation of said venturi means; means for effecting a restricted venting of gas from said chamber through said venturi means to the atmosphere during flow of gas into said chamber from said passage and flow of gas through said second named port to said mask; said venting means and said second named port having a combined capacity such that upon a predetermined reduction of flow of gas to said chamber, the positive pressure in said chamber will be ineffective to operate said fluid pressure responsive means; and means for so reducing the flow of gas to said chamber.

10. A resuscitator comprising: a housing having an intake port for gas under pressure, a gas chamber and passage means affording communication between said port and said chamber; said housing having a port for communicating said chamber with a mask to be applied to a patient; venturi means in said housing; said housing having a passage for conducting gas to said venturi means from said passage means; said housing including a negative pressure passage connecting said venturi means with said chamber; valve means in said passage means for controlling the flow of gas to said venturi means as well as to said chamber; fluid pressure-responsive means in said chamber for actuating said valve means to direct flow of gas through said passage means alternately to operate said venturi means and introduce gas into said chamber responsive to positive and negative pressures in said chamber; means effective during flow of gas from said passage means to said chamber for venting a restricted amount of such gas to the atmosphere; said last named means including a passage affording communication of said chamber with the atmosphere; valve means connected with said first named valve means closing said last named passage during actuation of said venturi means and opening said last named passage when gas enters said chamber and is being discharged through said second named port; the gas venting capacity of said last named passage being such that upon an intentional predetermined reduction of flow of gas into said chamber, while gas is discharging through said second named port, the positive pressure in said chamber will be insufficient to operate said fluid pressure responsive means; and means for so reducing the flow of gas to said chamber.

11. A resuscitator comprising: a housing having an intake port for gas under pressure, a gas chamber and passage means affording communication between said port and said chamber; said housing having a port for communicating said chamber with a mask to be applied to a patient; venturi means in said housing; said housing having a passage for conducting gas to said venturi means from said passage means; valve means in said passage means operable to control flow of gas to said venturi means and said chamber; fluid pressure-responsive means in said chamber connected with said valve means and operating said valve means to direct flow of gas through said passage means alternately to operate said venturi means and introduce gas into said chamber responsive to positive and negative pressures in said chamber; said venturi means including a negative pressure passage through which said venturi means is operable to evacuate said chamber; said housing providing a vent passage for bleeding gas from said chamber to the atmosphere during flow of gas from said passage means to said chamber and through said second named port; a second valve means connected with said fluid pressure responsive means operable to close said negative pressure passage during flow of gas into said chamber and to open said negative pressure passage during operation of said venturi means; and a third valve means connected with and operable by said first named valve means for closing said vent passage during operation of said venturi means and opening said vent passage during said flow of gas into said chamber.

12. A resuscitator comprising: a housing having an intake port for gas under pressure, a gas chamber and passage means affording communication between said port and said chamber; said housing having a port for communicating said chamber with a mask to be applied to a patient; venturi means in said housing; said housing having a passage for conducting gas to said venturi means from said passage means; said venturi means including a negative pressure passage connecting said venturi means with said chamber; valve means in said passage means for controlling the flow of gas to said venturi means as well as to said chamber; fluid pressure-responsive means in said chamber connected with said valve means and operating said valve means to direct flow of gas through said passage means alternately to operate said venturi and introduce gas into said chamber responsive to predetermined positive and negative pressures developed in said chamber; means including a vent passage having a capacity for venting positive pressure from said chamber in an amount sufficient to prevent said positive pressure actuation of said valve means only when the flow of gas from said passage means to said chamber and through said second named port is reduced to the extent that the amount of gas vented prevents the development in said chamber of said predetermined positive pressure.

13. A resuscitator comprising: a housing having an intake port for gas under pressure, a gas chamber and passage means affording communication between said port and said chamber; said housing having a port for communicating said chamber with a mask to be applied to a patient; venturi means in said housing; said housing having a passage for conducting gas to said venturi means from said passage means; said venturi means including a negative pressure passage connecting said venturi means with said chamber; valve means in said passage means for controlling the flow of gas to said venturi means as well as to said chamber; fluid pressure responsive means in said chamber connected with said valve means for actuating said valve means to direct flow of gas through said passage means alternately to operate said venturi and introduce gas into said chamber responsive to predetermined positive and negative pressures developed in said chamber; means including a vent passage having a venting capacity for relieving positive pressure from said chamber in an amount sufficient to prevent positive pressure actuation of said valve means only when the flow of gas from said passage means to said chamber is reduced to the extent that if such reduced flow were directed to said venturi means, the venturi means would be inoperable to produce said predetermined negative pressure in said chamber; and valve means in said passage means optionally operable to reduce the flow of gas to said chamber.

14. A resuscitator comprising: a housing having an intake port for gas under pressure, a gas chamber and passage means affording communication between said port and said chamber; said housing having a port for communicating said chamber with a mask to be applied to a patient; venturi means in said housing; said housing having a passage for conducting gas to said venturi means from said passage means; said venturi means including a negative pressure passage connecting said venturi means with said chamber; valve means in said passage means for controlling the flow of gas to said venturi means as well as to said chamber; fluid pressure responsive means in said chamber connected with said valve means and operable to actuate said valve means for alternately directing flow of gas through said passage means to operate said venturi and introduce gas into said chamber responsive to predetermined positive and negative pressures developed in said chamber; manually operable valve means in said passage means for regulating the flow of gas to said venturi means and said chamber; and means including a vent passage communicating said chamber with the atmosphere and operable responsive to manipulation of said manually operable valve means to vent sufficient positive pressure from said chamber while gas flows through said second named port to prevent the development of said predetermined positive pressure in said chamber.

15. In a resuscitator: a housing providing a chamber; said housing having an intake port for gas under pressure, a vent port open to the atmosphere, passage means affording communication of said intake port with said chamber as well as with said vent port, and a resuscitation port affording communication of said chamber with a mask; venturi means in said housing; said housing having a passage for conducting gas to said venturi means from said passage means said venturi means being arranged to discharge through said vent port and having a negative pressure port; said housing having a constantly open vent passage affording communication of said negative pressure port with said chamber; valve means in said housing operable when in one position to open said passage means between said intake port and said chamber and to close said passage means between said intake port and said venturi means to render the latter inoperative; said vent passage permitting some of the gas in said chamber to escape through the venturi means and said vent port when said venturi means is inoperative; said valve means opening said passage means between said venturi means and said intake port to operate said venturi means and closing said passage means between said intake port and said chamber when in another position, whereby said venturi means will create negative pressure in said chamber; means in said chamber operable responsive to positive and negative pressures in said chamber to move said valve means into and out of said positions; and manually operable valve means for controlling the flow of gas through said passage means.

16. In a resuscitator: a housing providing a chamber; said housing having an intake port for gas under pressure, a vent port open to the atmosphere, passage means affording communication of said intake port with said vent port as well as with said chamber, and a resuscitation port affording communication of said chamber with a mask; venturi means in said housing; said housing having a passage for conducting gas to said venturi means from said passage means arranged to discharge through said vent port; valve means in said passage means for controlling the flow of gas to said venturi means as well as to said chamber; and fluid pressure responsive means in said chamber connected with said valve means and operable according to predetermined positive and negative pressures in said chamber for actuating said valve means alternately to operate said venturi means and supply gas to said chamber; said passage means including a negative pressure passage affording communication between said chamber and said venturi means for evacuating said chamber; said negative pressure passage being operable upon cessation of operation of said venturi means, to vent gas from said chamber to the atmosphere through said venturi and said vent port during the inhalation cycle.

17. A resuscitator comprising: a housing having an intake port for gas under pressure, a gas chamber, a valve chamber, a discharge port and a port through which positive and negative pressures in said chamber are effective for application to a patient's lungs; said housing also having an intake passage between said intake port and said valve chamber, a venturi passage between said discharge port and said valve chamber, a positive pressure passage between said valve chamber and said gas chamber, and a negative pressure passage between said venturi passage and said gas chamber; venturi means in said venturi passage having a negative pressure port in communication with said negative pressure passage; said venturi means arranged to discharge gas outwardly therefrom through said venturi passage and said discharge port; valve means in said valve chamber for controlling flow of gas to said venturi means and said positive pressure passage; fluid pressure responsive means in said housing connected with said valve means and operable responsive to positive and negative pressures in said gas chamber to alternately direct gas to operate said venturi means and to flow through said positive pressure passage into said gas chamber; manually operable valve means associated with said intake passage for controlling the flow of gas to said valve chamber; and means including a vent passage communicating said gas chamber with the atmosphere and effective upon manipulation of said manually operable valve means to render said fluid pressure responsive means inoperable during flow of gas into said gas chamber through said positive pressure passage.

18. A resuscitator comprising: a housing having an intake port for gas under pressure, a gas chamber, a valve chamber, a discharge port and a port through which positive and negative pressures in said chamber are effective for application to a patient's lungs; said housing also having an intake passage between said intake port and said valve chamber, a venturi passage between said discharge port and said valve chamber; a positive pressure passage between said valve chamber and said gas chamber, and a negative pressure passage between said venturi passage and said gas chamber; venturi means in said venturi passage having a negative pressure port in communication with said negative pressure passage; said venturi means being arranged to discharge gas outwardly therefrom through said venturi passage and said discharge port; valve means in said valve chamber for controlling flow of incoming gas through said venturi passage and said positive pressure passage; fluid pressure responsive means in said housing connected with said valve means and operable responsive to positive and negative pressures in said gas chamber to alternately direct gas into said venturi passage and said positive pressure passage; manually operable valve means associated with said intake passage for controlling the flow of gas to said valve chamber; and means including a constantly open vent passage communicating said gas chamber with the atmosphere and effective upon predetermined manipulation of said manually operable valve means to render said fluid pressure responsive means inoperable during flow of gas into said gas chamber through said positive pressure passage.

19. In a resuscitator characterized by a housing for receiving gas under pressure and discharging gas therefrom to effect the inhalation phase of the resuscitator, venturi means operable in the housing to create a negative pressure for effecting the exhalation phase of the resuscitator, and wherein pulmometrically controlled operating means is operable in the housing in response to predetermined gas pressures, alternately to cause operation of the resuscitator on said phases: the improvement which includes manually operable control means for regulating the flow of the gas into the housing; and port means for venting gas from the housing to the atmosphere at a predetermined rate such that when said control means is operated to effect a predetermined reduction of the flow of gas into said housing while the resuscitator is subject to operation on said inhalation phase, the gas pressure in the housing will be effective to cause flow of gas to the patient but will be ineffective to actuate said operating means for causing operation of the resuscitator on said exhalation phase.

20. In a resuscitator characterized by a housing for receiving gas under pressure and discharging gas therefrom to effect the inhalation phase of the resuscitator, venturi means operable in the housing to create a negative pressure for effecting the exhalation phase of the resuscitator, and wherein pulmometrically controlled operating means is normally operable in the housing in response to predetermined gas pressure alternately to cause operation of the resuscitator on said phases: the improvement which includes in combination; means adjustable for regulating the flow of the gas into the housing; and port means which vents gas from the housing to the atmosphere at a predetermined rate such that the gas pressure in said housing will be effective to cause flow of gas to the patient but will be ineffective to operate said operating means when said control means is adjusted to maintain a predetermined reduced flow of gas into the housing.

21. In a resuscitator characterized by a housing for receiving gas under pressure and discharging gas therefrom to effect the inhalation phase of the resuscitator, venturi means operable in the housing to create a negative pressure for effecting the exhalation phase of the resuscitator, and wherein pulmometrically controlled operating means is operable in the housing in response to predetermined gas pressure, alternately to cause operation of the resuscitator on said phases: the improvement which includes manually operable means for regulating the rate of flow of the gas into the housing in combination with port means which latter vents gas from the housing to the atmosphere at a predetermined rate such that the fluid pressures in said housing will be effective to operate said operating means to cause said alternate operation when said manually operable means provides a predetermined flow of gas into said housing; the rate of said venting being such that upon a predetermined reduction of flow of gas into the housing, the gas pressure in the housing will be effective to cause flow of gas to the patient but will be ineffective to operate said operating means for causing operation of the resuscitator on said exhalation phase.

References Cited in the file of this patent

UNITED STATES PATENTS

| | | |
|---|---|---|
| 2,268,172 | Sinnett | Dec. 30, 1941 |
| 2,408,136 | Fox | Sept. 24, 1946 |
| 2,483,698 | Goodner | Oct. 4, 1949 |
| 2,582,210 | Stanton | Jan. 8, 1952 |